United States Patent Office 3,798,172
Patented Mar. 19, 1974

3,798,172
DYEING TEXTILE MATERIALS WITH VAT AND SULFUR DYES AND REDUCING AGENT STABILIZERS FOR SAME
James N. Etters, Danville, Va., assignor to Dan River Inc., Danville, Va.
No Drawing. Original application May 26, 1969, Ser. No. 827,894, now Patent No. 3,645,665. Divided and this application Nov. 23, 1971, Ser. No. 201,542
Int. Cl. D06p *1/30;* C09k *3/00*
U.S. Cl. 252—188
4 Claims

ABSTRACT OF THE DISCLOSURE

An improved process for dyeing cellulosic textiles with vat or sulfur dyes using sodium dithionite as reducing agent, using as a stabilizer for the reducing agent a stabilizer of the formula

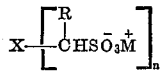

wherein M is a monovalent cation selected from the class consisting of alkali metal and ammonium cations, R is a monovalent group selected from the class consisting of hydrogen, alkyl, alkenyl and furyl, $n$ is an integer of 1 to 3, X is a group having a valence of $n$ and is selected from the class consisting of hydroxyl and substituents having the formula $$R'_{3-n}N$$

and R' is a monovalent radical selected from the class consisting of hydrogen and monovalent hydrocarbon, said stabilizer being used in an amount providing about 0.01 to about 2 mols of

unit of said stabilizer per mol of said reducing agent. Also, the stabilizer as defined above in dry particulate form and novel mixtures of reducing agent and stabilizer.

This is a division of application Ser. No. 827,894 filed May 26, 1969, now U.S. Pat. No. 3,645,665.

BACKGROUND OF THE INVENTION

(a) Field of the invention

The present invention relates to an improved process for dyeing cellulosic textiles with vat or sulfur dyes using sodium dithionite as a reducing agent and using a novel stabilizer comprising the addition products of an organic aldehyde and sodium bisulfite with or without ammonium or a suitable organic primary or secondary amine. The invention also relates to novel mixtures of sodium dithionite and such stabilizers, preferably as a dry mixture and also relates to the stabilizer in dry particulate form which is easy to handle, ship, and/or store.

(b) Description of the prior art

Sodium dithionite has long been used and is still being used quite extensively in the dyeing of cellulosic textiles with vat or sulfur dyestuffs. It has been a considerable problem to prevent oxidative decomposition of sodium dithionite during the dyeing process. Sodium dithionite is such an efficient reducing agent that mere exposure to air at moderate temperatures will bring about its oxidative decomposition.

Attempts have been made to overcome this problem. As early as 1911 it had been proposed to add acetaldehyde to the dyebath containing sodium dithionite during vat and indigo printing. In 1921 there was offered for sale sodium acetaldehyde sulfoxylate which decomposed with heat to liberate active reducing agent. The addition of acetaldehyde to the dyebath in itself posed problems. Because of its high volatility acetaldehyde which boils at room temperatures was lost to the atmosphere and thus not only created a health hazard but was wasteful. The sodium acetaldehyde sulfoxylate product mentioned above was expensive and more difficult to manufacture in a form convenient for textile uses.

In addition, sodium dithionite has been used in conjunction with sulfinic acid derivatives as described in U.S. Pat. No. 3,265,459 and British Pat. Nos. 873,940 and 829,-177. Such derivatives are expensive and difficult to make in a form advantageous for use in the dyebath.

SUMMARY OF THE INVENTION

The present invention provides an improved dyeing process using vat or sulfur dyestuffs and sodium dithionite as a reducing agent and using novel stabilizers for the reducing agent. The stabilizers used in this invention are essentially nonvolatile as compared to the aldehydes, such as acetaldehyde and thus have little or no problems from a health or air pollution standpoint. Moreover, the stabilizer used herein can be produced in solid powder form, thus offering considerabe packaging, shipping, and handling advantages and can be mixed in such dry particulate form with dry sodium dithionite to produce a mixture which, upon being added to a heated, alkaline aqueous solution, produces a stabilized reducing solution for use in dyeing. Also, the stabilizers used herein show no tendency to flash off of the surface of the dyebath to which they are added, thus resulting in more efficient and economic use of materials.

The stabilizers used in this invention are the addition products of an aldehyde and an alkali metal or ammonium bisulfite in the presence of water.

The aldehyde-bisulfite addition products employed as stabilizers according to this invention can be represented by formula (I) 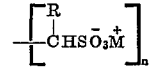

wherein M is a monovalent cation selected from the class consisting of alkali metal and ammonium cations, R is a monovalent group selected from the class consisting of hydrogen, alkyl preferably having 1 to 4 carbon atoms, alkenyl preferably having 1 to 4 carbon atoms, and furyl, $n$ is an integer of 1 to 3, X is a group having a valence of $n$ and is selected from the class consisting of hydroxyl and substituents having the formula $$R'_{3-n}N$$

and R' is a monovalent radical selected from the class consisting of hydrogen and monovalent hydrocarbon having 1 to 18, preferably 1 to 6, carbon atoms and preferably alkyl, said stabilizer being used in an amount providing about 0.01 ot about 2 mols of

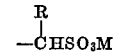

unit of said stabilizer per mol of said reducing agent.

These addition products are very easily prepared by mixing the aldehyde and the bisulfite in an aqueous mixture at room temperatures or elevated temperatures if desired. The addition products are formed by the reaction of 1 mol of the aldehyde and 1 mol of the bisulfite; therefore, the aldehyde and bisulfite need only be mixed in equimolar proportion. However, if desired, other than equimolar proportions can be employed. If it is desired to produce a dry, particulate stabilizer, the aqueous reaction solution is simply dehydrated, thus providing a dry powdery, flake or granular form of the addition product.

Suitable aldehydes which can be employed in the production of these addition products include formaldehyde, acetaldehyde, propionaldehyde, butyraldehyde, furfural [dehyde], acrolein and any other suitable aldehyde. The alkyl aldehydes, preferably those having 1 to 4 carbon atoms and furfural[dehyde] are preferred. Illustrative bisulfite reactants useful in the production of the addition products include sodium bisulfite, potassium bisulfite, other alkali metal bisulfites and ammonium bisulfite.

Listed below are several reaction equations which illustrate the reaction taking place during the production of the addition products.

(1) 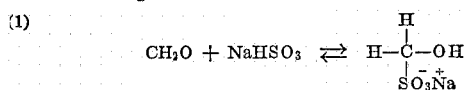

(2) 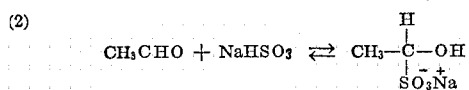

(3) 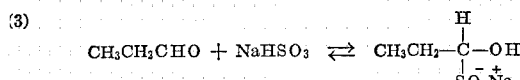

(4) 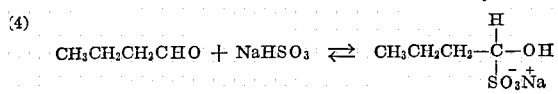

(5) 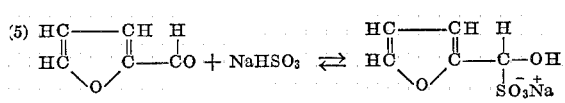

The addition products thus produced can be portrayed by Formula I wherein X is hydroxyl.

If desired, ammonia or a primary or secondary amine having the formula $R'_{3-n}NH_n$ can be added during or after the formation of the aldehyde-bisulfite addition product to form a stabilizer as defined by the Formula I wherein X is a substitutent having the formula $$R'_{3-n}N$$

wherein in both instances R' and $n$ are as defined above. When ammonia is condensed with the aldehyde-bisulfite addition product, the resulting addition product can be portrayed by Formula I wherein X is nitrogen and $n$ is 3. When a primary amine is used, the resulting product can be portrayed by Formula I wherein X has the formula R'N= and $n$ is 2. When a secondary amine is used, the resulting addition product can be portrayed by Formula I wherein X is $R'_2N-$ and $n$ is 1.

Any suitable primary amine can be used including methylamine, ethylamine, propylamine, aniline, toluidine, benzylamine and the like. Any suitable secondary amine can be used, e.g., dimethylamine, diethylamine and methylaniline. After further addition of ammonia or amine, the resulting addition product can also be dehydrated to form a powdery, flake or granular stabilizer.

The condensation of the aldehyde-bisulfite addition product with ammonia or the primary or secondary amine can be typified by the following reaction equation:

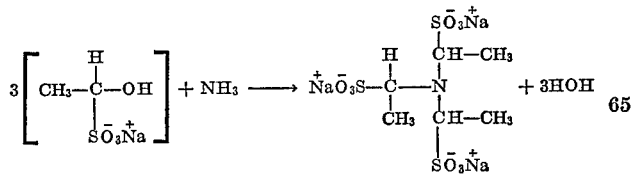

The addition products, with or without condensation with ammonia or amine can be added to the dyebath at any desired stage of dyeing. It is, however, preferred to add the addition product at or about the same time that the sodium dithionite is added so as to preclude as much as possible oxidative decomposition of the sodium dithionite before contact with the stabilizer. In those instances where the dyebath does not come into contact with oxygen or the atmosphere until a certain stage in the dyeing process, the stabilizer need not be contacted with the sodium dithionite until there is a risk of contact with oxygen. Thus, the stabilizer need only be contacted with the sodium dithionite at or about the time the sodium dithionite is likely to come into contact with oxygen or air. In most cases, it is desirable to add the reducing agent and stabilizer at about the same time to avoid the risk of undesired oxidative decomposition.

It is also convenient to mix the sodium dithionite in dry particulate form, e.g., powder, granules, or flakes, with the addition product stabilizer which is also in dry particulate form, e.g. powder, granules or flakes. The dry mixture can then be conveniently packaged, shipped, handled and used with little loss through spillage, vaporization or decomposition.

The relative proportions of stabilizer and reducing agent employed are not narrowly critical and can be varied over a wide range. For example, amounts of stabilizer which provide 0.01 to 2 or more, preferably 0.02 to 1 or more, mols of $-CRHSO_3M$ unit of the stabilizer per mol of sodium dithionite are advantageous. Greater amounts of stabilizer can be used, but apparently do not provide any commensurate further improvement.

The addition product stabilizers described herein are useful in any dyeing procedure using any vat or sulfur dyestuffs which are reduced by sodium dithionite under heated alkaline conditions. The particular dyeing process employed has no limiting effect on the use of the addition product stabilizer described and claimed herein, for example, these stabilizers can be used in machine dyeing processes for yarn in beams and packages. The stabilizers can also be used in the dyeing of fabric (knitted or woven) by the pad-steam process or the pad-jig process or any other process employed for dyeing fabrics, yarns or fibrous rawstock, etc. with vat or sulfur dyestuffs which are reduced by sodium dithionite.

The term "cellulosic textile" as used herein includes all-cotton fabrics and yarns, or fabrics and yarns containing cotton blended with synthetic or other fibers such as rayon, polyester, polyacrylonitrile fibers and the like and covers any yarn, rawstock of such fibers or any such fabric whether woven or knitted.

DESCRIPTION OF SPECIFIC EMBODIMENTS

The following examples are presented wherein all parts and percentages are on a weight basis and all temperatures are on the Fahrenheit scale. The following terms used in the examples are explained as follows:

Igepon T—A synthetic detergent formed by the condensation of oleyl chloride with methyl taurine. This detergent is stable to hot alkali, and is therefore suitable for vat dyeing operations.

B.I.O.S.—British Intelligence Objectives Sub-Committee.

F.I.A.T.—United States Field Intelligence Agency Technical.

C.I.—Color index number.

HEDTA—Hydroxyethyl ethylene diamine triacetic acid, usually in the form of a trisodium salt. This compound functions merely as a water softening agent to prevent, for example, precipitation of vat dye by the calcium and magnesium salts present in the dyebath.

EXAMPLE 1

At 80° F., an initial mixture was prepared comprising:

| | Parts |
|---|---|
| Anthraquinone Vat Golden Orange G (C.I. 1096) | 5 |
| Igepon T | 1 |
| Sodium hydroxide (flakes) | 10 |
| Water | 984 |
| | 1000 |

To 500 parts of the above initial mixture at 160° F. there was added 2.5 parts sodium dithionite (hydro) to produce vat dye solution "A" as a control.

To another 500 part portion of the initial mixture at 160° F. there was added, in accordance with this invention:

2.5 parts sodium dithionite and
5.0 parts of a solution containing:
    10% by wt. of acetaldehyde
    25% by wt. of sodium bisulfite
    65% by wt. of water to produce vat dye solution "B."

500 parts of vat solution "A" and 500 parts of vat solution "B" were each mainatined at 160° F. without agitation in open dyepots for a period of two hours, during which time the reducing agent concentration in both solution A" and solution "B" was measured at intervals listed below by usual titration methods and expressed in grams/liter sodium dithionite. The following data were obtained:

| Time (min.) | Reducing agent concentration, grams per liter sodium dithionite | |
|---|---|---|
| | Solution "A" (Control) | Solution "B" |
| 10 | 3.1 | 3.3 |
| 20 | 2.8 | 2.8 |
| 30 | 2.4 | 2.8 |
| 30 | 2.2 | 2.8 |
| 50 | 2.1 | 2.8 |
| 60 | 1.7 | 2.8 |
| 70 | 1.3 | 2.8 |
| 120 | 0.6 | 2.5 |

This comparative data clearly shows the stabilizing action of the bisulfite addition products in accordance with this invention.

EXAMPLE 2

Medium weight cotton fabric prepared for dyeing was padded continuously at 110° F. with a pigment pad mixture comprising:

| | Parts |
|---|---|
| Anthraquinone Vat Olive T (B.I.O.S. 987, 7) | 44.0 |
| Anthraquinone Vat Yellow 5GLL | 5.4 |
| Anthraquinone Vat Jade Green (F.I.A.T. 1313, II, 191) | 2.0 |
| Sodium acetate | 4.0 |
| Sodium alginate | 1.0 |
| Water | 943.6 |
| | 1000.0 |

The impregnated fabric was dried at 225° F. and divided into four swatches, "A," "B," "C," and "D."

Swatch "A" was padded continuously at 80° F. through reducing solution #1 which comprised:

| | Parts |
|---|---|
| Sodium hydroxide (flakes) | 35.0 |
| Sodium dithionite | 18.0 |
| Water | 947.0 |
| | 1000.0 |

After being padded through reducing solution #1, swatch "A" immediately was entered into a steamer and steamed 30 seconds at 215° F. The fabric was then finished off as usual.

Swatch "B" was padded continuously at 80° F. through reducing solution #1, but was exposed to air for one minute before being entered into the steamer for 30 seconds at 215° F. Swatch "B" was then finished off in the same manner as swatch "A."

Swatches "A" and "B" do not illustrate the present invention but are presented for comparison purposes.

Swatch "C" was padded continuously at 80° F. through reducing solution #2 which comprised:

| | Parts |
|---|---|
| Sodium hydroxide (flakes) | 35.0 |
| sodium dithionite | 18.0 |
| An aqueous solution containing: 10% by wt. acetaldehyde; 25% by wt. sodium bisulfite; and 65% by wt. water | 27.0 |
| Water | 920.0 |
| | 1000.0 |

After being padded through reducing solution #2, swatch "C" immediately was entered into a steamer and steamed 30 seconds at 215° F. Swatch "C" was finished off in the same manner as swatch "A."

Swatch "D" was padded continuously at 80° F. through reducing solution #2, but was exposed to air for one minute before being entered into the steamer for 30 seconds at 215° F. Swatch "D" was then finished off in the same manner as swatch "A."

Swatches "C" and "D" illustrate the present invention. Examination of the four swatches revealed that:

Swatch "A" was dyed a medium depth olive shade,
Swatch "B" was almost completely undyed,
Swatch "C" was dyed a medium depth olive shade, and
Swatch "D" was deyed a medium depth olive shade.

These results clearly illustrate the stabilizing effectiveness of the addition product according to this invention.

EXAMPLE 3

Dyeing "A"

This part does not illustrate the invention but is presented for comparison purposes.

1010 grams of cotton yarn in package form was placed in a commercial package dyeing machine at a liquor to goods ratio of 7.5–1. The yarn was wet out and rinsed in the usual manner, and 22.5 grams of sequestering agent of trisodium HEDTA
7.5 grams Igepon T
15.0 grams complex diaryl sulfonate dispersing agent were added to the dyebath which then was circulated through the packages for ten minutes at 160° F. Then 80% of a dye mixture comprising:

121.2 grams Anthraquinone Vat Olive T (B.I.O.S. 987, 7)
7.8 grams Anthraquinone Vat Dark Blue BO (C.I. 1099)

was added to the dyebath and circulated through the packages for ten minutes at 160° F. Thereafter, 75.0 grams sodium hydroxide flakes (dissolved) and
30.0 grams sodium dithionite were added to the dyebath and dyeing was continued for one hour at 160° F.

The remaining 20% of the dye mixture was added and dyeing was continued for forty minutes. The yarn was finished off as usual.

Dyeing "B"

This part illustrates the present invention.
Dyeing "B" was conducted in exactly the same manner as dyeing "A" with the following exceptions:

(1) In addition to the 75.0 grams sodium hydroxide and
30.0 grams sodium dithionite, there was added 4.5 grams of an aqueous solution containing:

10% by wt. acetaldehyde
25% by wt. sodium bisulfite
65% by wt. water.

(2) Dyeing was continued seventy minutes after the addition of the remaining 20% dye, and the yarn was finished off as usual.

During the course of both dyeing "A" and dyeing "B," a record of reducing agent concentration expressed in grams/liter of sodium dithionite (Hydro) was made by the use of standard titration methods. Also, a record of redox potential was made by the use of a suitable instrument and standard technique. The following data were produced:

| Time (min.) | Dyeing "A" | | Dyeing "B" | |
|---|---|---|---|---|
| | G./l. hydro | Redox potential, mv. | G./l. hydro | Redox potential, mv. |
| 10 | 1.5 | −1,020 | 1.6 | −1,008 |
| 20 | 1.1 | −1,020 | 1.5 | −1,005 |
| 30 | 0.9 | −1,025 | 1.4 | −995 |
| 40 | 0.7 | −1,020 | 1.3 | −980 |
| 50 | 0.5 | −1,015 | 1.2 | −965 |
| 60 | 0.4 | −1,015 | 1.0 | −955 |
| 70 | 0.2 | −995 | 0.8 | −905 |
| 80 | 0.1 | −965 | 0.7 | −920 |
| 90 | Trace | −910 | 0.55 | −922 |
| 100 | Trace | −890 | 0.40 | −920 |
| 110 | | | 0.30 | −915 |
| 120 | | | 0.20 | −910 |
| 130 | | | 0.10 | −895 |
| | Final NaOH conc., 6.8 g./l. (flakes) | | Final NaOH conc., 6.8 g./l. (flakes) | |

The above data clearly shows the stabilizing action of the bisulfite addition products in accordance with this invention.

EXAMPLE 4

At 80° F., an initial solution was prepared which comprised:

| | Grams |
|---|---|
| Sodium hydroxide (flakes) | 10 |
| Sodium dithionite (hydro) | 10 |
| Trisodium HEDTA | 3 |
| Water | 977 |
| | 1000 |

The initial solution is divided with minimum dyebath aeration into four 250 gram portions, A, B, C, and D, contained in four open dyepots.

Portion "A" was kept as a control.

To portion "B" was added 0.25 gram of the anhydrous addition product formed by the reaction of furfural with an aqueous solution of an equal molar amount of sodium bisulfite, followed by dehydration of the product to produce the anhydrous addition product.

To portion "C" was added 1.25 grams of the above-described solid furfural-bisulfite addition product.

To portion "D" was added 2.5 grams of the above-described furfural-bisulfite addition product.

All four portions were heated to 160° F. and maintained at this temperature for one hour, during which time a record of reducing agent concentration expressed in grams/liter of sodium dithionite was made by the use of standard titration methods.

The following data were produced:

| Time (min.) | Reducing agent concentration, grams per liter hydro | | | |
|---|---|---|---|---|
| | A | B | C | D |
| 10 | 7.0 | 7.5 | 7.4 | 7.8 |
| 20 | 5.7 | 6.1 | 6.6 | 7.5 |
| 30 | 5.2 | 5.4 | 6.6 | 7.5 |
| 40 | 4.6 | 4.7 | 5.9 | 7.4 |
| 50 | 4.1 | 4.3 | 5.7 | 7.3 |
| 60 | 3.7 | 3.7 | 5.0 | 6.1 |

These results illustrate the stabilizing effectiveness of the addition products and the increase of effectiveness with increasing amounts of the addition products in accordance with the persent invention.

What is claimed is:

1. A stabilized reducing agent comprising a mixture of sodium dithionite as reducing agent and as a stabilizer for said reducing agent a compound of the formula

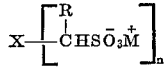

wherein M is a monovalent cation selected from the class consisting of sodium, potassium and ammonium cations, R is a monovalent group selected from the class consisting of alkyl having 1 to 4 carbon atoms, alkenyl having 1 to 4 carbon atoms and furyl, n is an integer of 1 to 3 and X is a group having a valence of n and is selected from the class consisting of hydroxyl and substituents derived from a member selected from the class consisting of ammonia, a primary amine and a secondary amine and having the formula $$R'_{3-n}N$$

wherein R' is a monovalent radical selected from the class consisting of hydrogen and hydrocarbon having 1 to 18 carbon atoms, said stabilizer being used in an amount providing about 0.01 to about 2 mols of

unit of said stabilizer per mol of said reducing agent.

2. A stabilized reducing agent as claimed in claim 1 wherein R is methyl, X is hydroxyl and n is 1.

3. A stabilized reducing agent as claimed in claim 1 wherein R is furyl, X is hydroxyl and n is 1

4. A stabilized reducing agent comprising in dry, particulate form the stabilized reducing agent defined in claim 1.

References Cited

UNITED STATES PATENTS

| 1,759,071 | 5/1930 | Thompson | 8—34 |
| 3,433,590 | 3/1969 | Van Weele | 252—188 |
| 3,468,623 | 9/1969 | Van Weele | 252—188 |

LEON D. ROSDOL, Primary Examiner

I. GLUCK, Assistant Examiner

U.S. Cl. X.R.

8—34, 37; 423—515